United States Patent
Shin et al.

(10) Patent No.: US 11,663,091 B2
(45) Date of Patent: May 30, 2023

(54) TRANSPARENT DATABASE SESSION RECOVERY WITH CLIENT-SIDE CACHING

(71) Applicant: SAP SE, Walldorf (DE)

(72) Inventors: Dongin Shin, Seoul (KR); Yeonghun Jeong, Seoul (KR); Jeong Hee Won, Seoul (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 16/222,775

(22) Filed: Dec. 17, 2018

(65) Prior Publication Data

US 2020/0192766 A1 Jun. 18, 2020

(51) Int. Cl.
*G06F 11/14* (2006.01)
*G06F 16/2455* (2019.01)

(52) U.S. Cl.
CPC .... *G06F 11/1469* (2013.01); *G06F 16/24552* (2019.01); *G06F 2201/84* (2013.01)

(58) Field of Classification Search
CPC ........... G06F 11/1469; G06F 16/24552; G06F 2201/84; G06F 16/252; G06F 16/2471
See application file for complete search history.

(56) References Cited

U.S. PATENT DOCUMENTS

| | | | | |
|---|---|---|---|---|
| 6,862,689 B2* | 3/2005 | Bergsten | ............. | G06F 11/1471 714/15 |
| 8,229,969 B1* | 7/2012 | Floyd | .................... | G06F 16/957 707/802 |
| 2008/0126831 A1* | 5/2008 | Downey | .................. | H04L 69/40 714/4.2 |
| 2010/0005097 A1* | 1/2010 | Liang | ...................... | G06F 16/27 707/E17.032 |
| 2013/0066952 A1* | 3/2013 | Colrain | ............... | G06F 11/1438 709/203 |

OTHER PUBLICATIONS

R. S. Barga and D. B. Lomet, "Measuring and optimizing a system for persistent database sessions," Proceedings 17th International Conference on Data Engineering, 2001, pp. 21-30, doi: 10.1109/ICDE.2001.914810. (Year: 2001).*

Extended European Search Report dated Apr. 8, 2020 for EP Application No. 19214758, 7 pages.

"Summons to attend oral proceedings pursuant to Rule 115(1) EPC" in Related European Patent Application No. 19214758.5-1203; dated Feb. 28, 2023; (Ref No. S14637EU-hb), 32 pages.

Steven A. Smith, "ASP.NET Caching: Techniques and Best Practices", Aug. 31, 2003, pp. 1-11, XP055376447, Retrieved from the Internet: URL:https://web.archive.org/web/20151214172251/https://msdn.microsoft.com/en-US/library/aa478965.aspx [retrieved on May 26, 2017].

Mihalcea Vlad: "Caching best practices", Jan. 29, 2018, XP093021950, Retrieved from the Internet: URL:https://web.archive.org/web/20180223192843/https://vladmihalcea.com/caching-best-practices/ [retrieved on Feb. 8, 2023].

* cited by examiner

*Primary Examiner* — Mark D Featherstone
*Assistant Examiner* — Samuel C Sharpless, III
(74) *Attorney, Agent, or Firm* — Fountainhead Law Group P.C.

(57) ABSTRACT

A client computer establishes one or more sessions with a DBMS. Session context information for each session is cached in a client-side session cache. When a session disconnection is detected, the session recovery includes establishing a new session with the DBMS, and restoring the session context of the disconnected session from the session information of the disconnected session that is stored in the session cache.

20 Claims, 7 Drawing Sheets

TRANSPARENT DATABASE SESSION RECOVERY WITH CLIENT-SIDE CACHING

BACKGROUND

One of the key strengths of database systems is that the database can ensure the recovery of persistent tables against most system failures. However, a system failure is nonetheless a disruptive event to database applications that access the database system because client-server database sessions can become disconnected, resulting in the loss of all the session context information. For example, a database client may set its locale as "Germany" so that, for the particular database session established by the client, all subsequent queries are performed under this local value, which is stored in the context of the database session. However, if the server is restarted. the locale will be reset to a default value such as "US," which can affect the queries. Application programmers can add additional defensive code to guard against the possibility of such a system failures and the subsequent loss of session context information.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
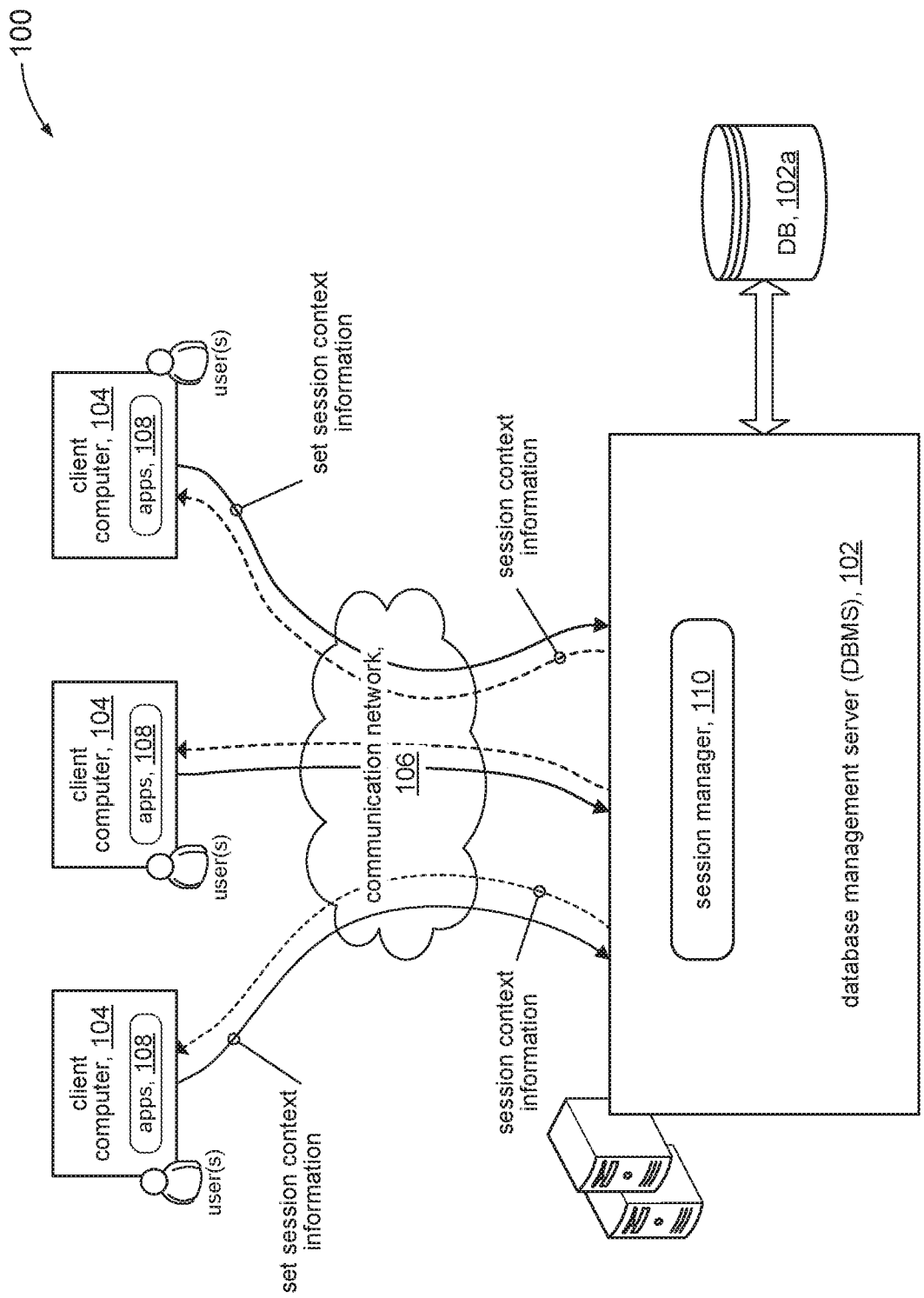
FIG. 1 shows a system in accordance with some embodiments of the present disclosure.

FIG. 1 shows a database system 100 in accordance with some embodiments of the present disclosure. The database system 100 can include a database management server (DBMS) 102 comprising an underlying database 102a and corresponding database services to access and maintain the database 102a. Users can access the DBMS 102 via client computers 104. A communication network 106 can provide communication between the client computers 104 and DBMS 102. The communication network 106 represents any suitable form of communication infrastructure, including but not limited to public switched networking, local area networks, wide area networks, direct connections to the DBMS 102 (e.g., for administrative users), and so on.

In some embodiments, a user on a client computer 104 can run one or more database applications 108 to communicate with the DBMS 102. Each application 108 can create one or more sessions with the DBMS 102 to do some work on the database 102a. A session manager 110 in the DBMS 102 can manage the various sessions associated with the applications 108 executing among the client computers 104. In accordance with the present disclosure, the client computer 104 and the DBMS 102 can exchange session context information. In some embodiments, as shown in FIG. 1 for example, the client computer 104 can set the session context information (e.g., using a database command) and the DBMS 102 can provide the session context information to the client computer 104. These aspects of the present disclosure are discussed below.

In the context of the present disclosure, a session refers to the interactive exchange between an application 108 and DBMS 102. For example, a user using an application 108 can establish a session on the DBMS 102 in order to access the database 102a; e.g., by logging onto the DBMS. During a given session, additional information relating to the session may be established. Such information can be referred to as session context information because it is specific to, and only relevant to, a particular session. For example, a user may set a session locale that specifies their geographical location (e.g., for time zone purposes). The user may specify language, monetary units, and the like. The user may change certain session settings during their session. For example, the user may specify monetary units in US dollars in one instance, and later on in the same session change to South Korean won. The session context information can be database specific information such as current database and user temporary objects, such as temporary tables, and so on.

The session manager 110 in the DBMS 102 can keep track of the session context information, and can provide such information to various functional units (not shown) in the DBMS 102 during the session. For example, the DBMS 102 may perform time zone conversions depending on the user's locale setting. If the user specifies a monetary unit (e.g., US dollars, South Korean won, etc.), the DBMS 102 can perform suitable monetary unit conversions, and so on. When the session is terminated (e.g., the user logs off) the session context information is "forgotten." In other words, the session context information is transient and is not persisted in the client computer 104 or by the session manager 110. When the same user logs back in, the have to set up the session context again.

Figure 2:
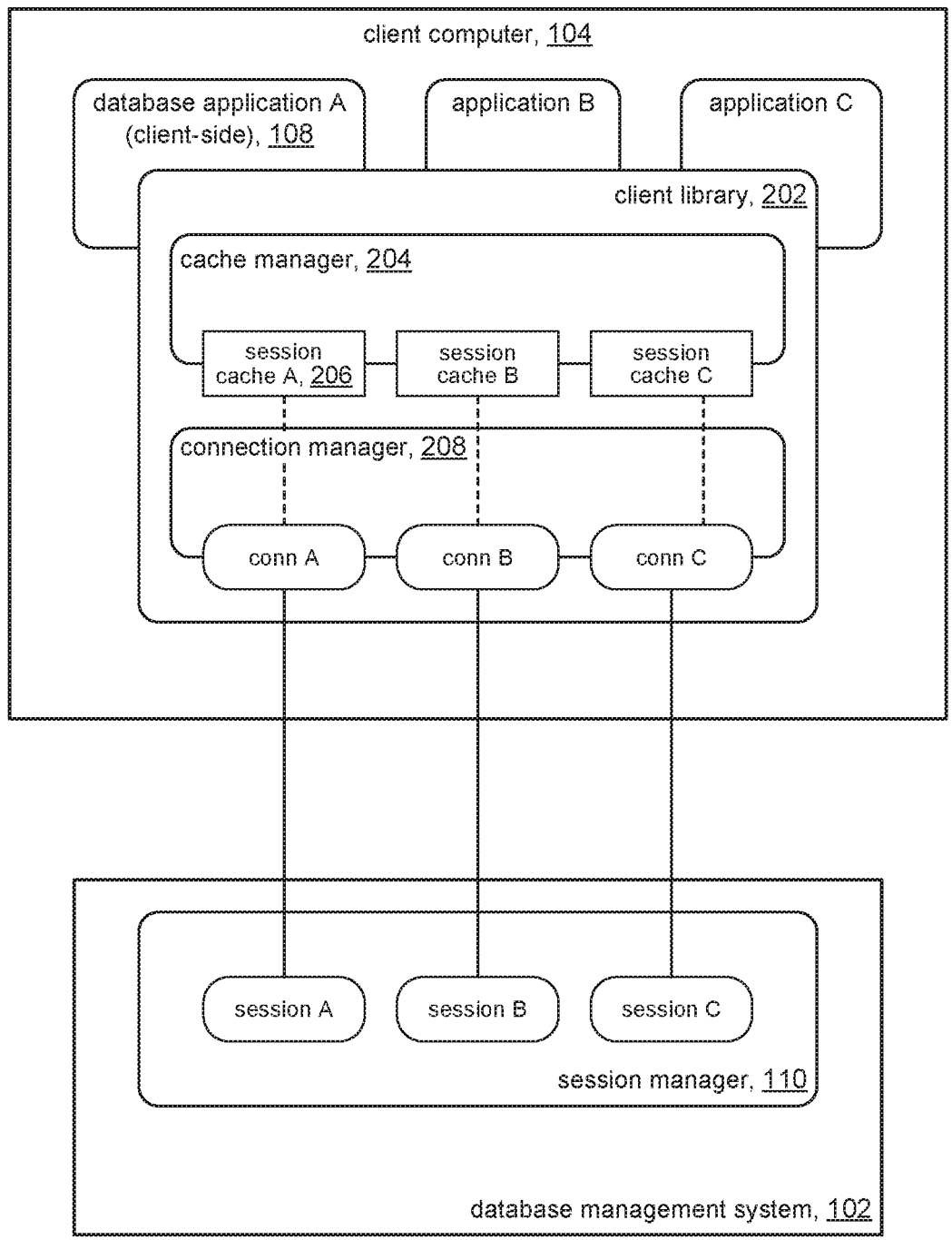
FIG. 2 shows details in an application executing on the client computer in accordance with some embodiments of the present disclosure.

FIG. 2 shows some details of a database application 108 in accordance with some embodiments of the present disclosure. Applications 108 can share common functionality to access the DBMS 102; e.g., open a database, create a data table, etc. These common functions can be provided in a client library 202 that each application 108 can be linked to.

The client library 202 can include a cache manager 204, and in particular application programming interfaces (APIs) to a caching functionality. In accordance with the present disclosure, the cache manager 204 can provide session caching for the application 108. In some embodiments, for example, the cache manager 204 can maintain a session cache 206 for each session that the application 108 creates. In some embodiments, the session cache 206 can be any suitable persistent storage, such as non-volatile memory (e.g., static RAM), disk storage, etc.

The client library 202 can include a connection manager 208. The connection manager 208 can communicate with the DBMS 102, for example, to establish/create a connection with the DBMS 102. FIG. 2, for example, shows three connections, A, B, C, with the DBMS 102, with respective applications A, B, C. The connection manager 208 can use any suitable communication protocol to communicate with the DBMS 102. In some embodiments, for example, the connection manager 208 can use the TCP/IP protocol for communication over the Internet. In other embodiments, other communication protocols can be used. The connections A, B, C, for example, can be used to support SQL processing (e.g., send queries and receive replies) between the applications 108 and the DBMS 102. In some instances, an application 108 can set up a single connection such as shown in FIG. 2. In other instances (not shown), an application 108 may set up several connections with the DBMS 102; e.g., in an application having multiple threads, some of the threads may have its own connection with the DBMS 102.

FIG. 2 shows that the session manager 110 on the DBMS 102 can maintain corresponding session data A, B, C for each respective connection A, B, C. The session data can comprise any suitable information relating to the session. For example, session data can include information that is defined by the application; e.g., application name (e.g, HDBStudio), user information such as an application defined user name, case sensitivity (T/F), locale, etc. Session data can be defined by the client library 202; e.g., operating system account and other system-level information. Users can set up session data, for example by using an appropriate API such as an SQL SET command (e.g., SET FOO="BAR").

Figure 3:
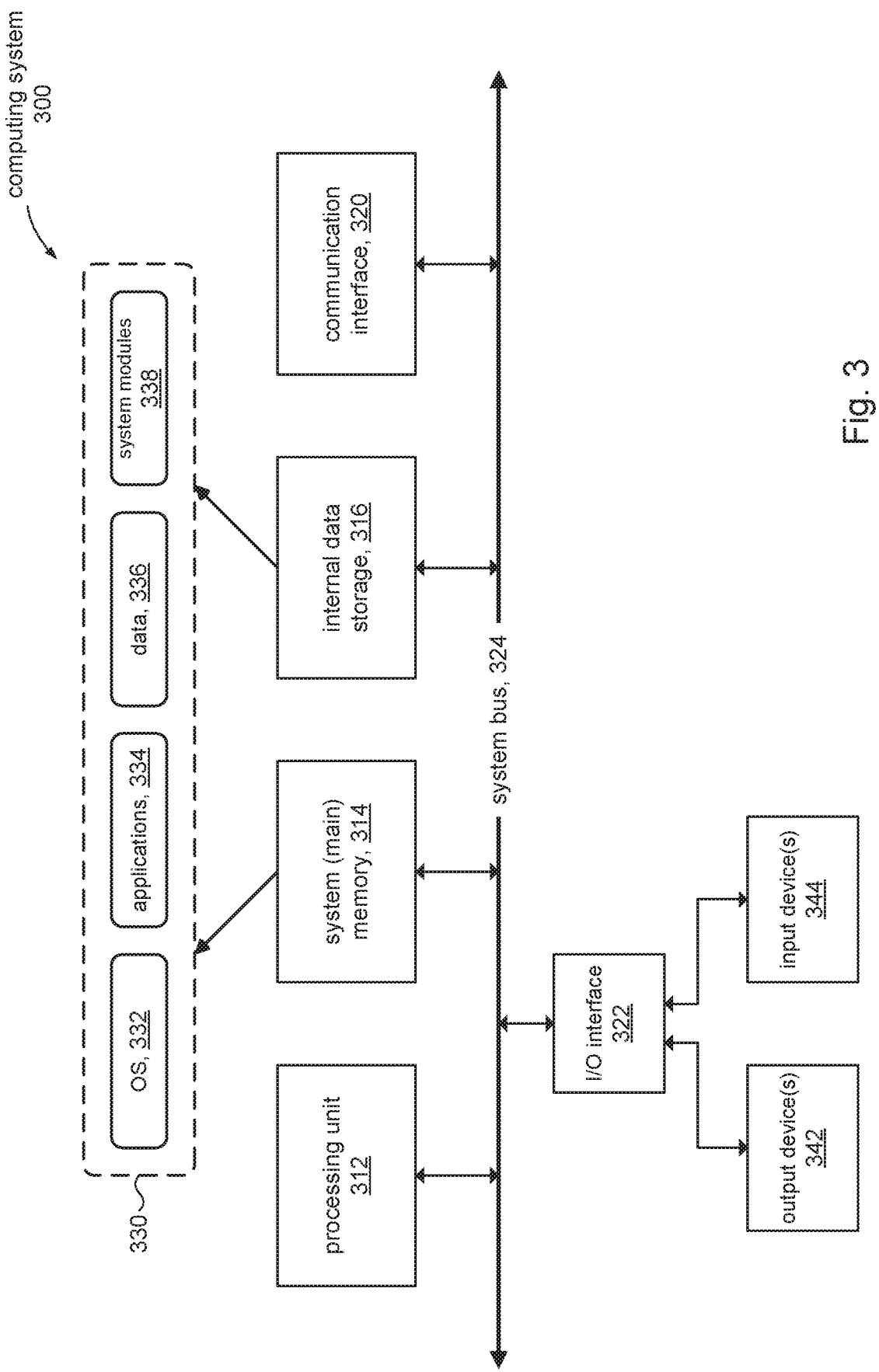
FIG. 3 shows an illustrative computer system that can be configured according to some embodiments of the present disclosure.

FIG. 3 is a simplified block diagram of an illustrative computing system 300 for implementing one or more of the embodiments described herein (e.g., client computer 104, DBMS 102, FIG. 1). The computing system 300 can perform and/or be a means for performing, either alone or in combination with other elements, operations in accordance with the present disclosure. Computing system 300 can also perform and/or be a means for performing any other steps, methods, or processes described herein.

Computing system 300 can include any single- or multi-processor computing device or system capable of executing computer-readable instructions. Examples of computing system 300 include, for example, workstations, laptops, servers, distributed computing systems, and the like. In a basic configuration, computing system 300 can include at least one processing unit 312 and a system (main) memory 314.

Processing unit 312 can comprise any type or form of processing unit capable of processing data or interpreting and executing instructions. The processing unit 312 can be a single processor configuration in some embodiments, and in other embodiments can be a multi-processor architecture comprising one or more computer processors. In some embodiments, processing unit 312 can receive instructions from program and data modules 330. These instructions can cause processing unit 312 to perform operations in accordance with the various disclosed embodiments (e.g., FIGS. 4, 5) of the present disclosure.

System memory 314 (sometimes referred to as main memory) can be any type or form of storage device or storage medium capable of storing data and/or other computer-readable instructions, and comprises volatile memory and/or non-volatile memory. Examples of system memory 314 include any suitable byte-addressable memory, for example, random access memory (RAM), read only memory (ROM), flash memory, or any other similar memory architecture. Although not required, in some embodiments computing system 300 can include both a volatile memory unit (e.g., system memory 314) and a non-volatile storage device (e.g., data storage 316).

In some embodiments, computing system 300 can include one or more components or elements in addition to processing unit 312 and system memory 314. For example, as illustrated in FIG. 3, computing system 300 can include internal data storage 316, a communication interface 320, and an I/O interface 322 interconnected via a system bus 324. System bus 324 can include any type or form of infrastructure capable of facilitating communication between one or more components comprising computing system 300. Examples of system bus 324 include, for example, a communication bus (such as an ISA, PCI, PCIe, or similar bus) and a network.

Internal data storage 316 can comprise non-transitory computer-readable storage media to provide nonvolatile storage of data, data structures, computer-executable instructions, and so forth to operate computing system 300 in accordance with the present disclosure. For instance, the internal data storage 316 can store various program and data modules 330, including for example, operating system 332, one or more application programs 334, program data 336, and other program/system modules 338 to support and perform various processing and operations disclosed herein. In some embodiments, internal data storage 316 can provide persistent storage for the session cache 206 shown in FIG. 2.

Communication interface 320 can include any type or form of communication device or adapter capable of facilitating communication between computing system 300 and one or more additional devices. For example, in some embodiments communication interface 320 can facilitate communication between computing system 300 and a private or public network including additional computing systems. Examples of communication interface 320 include, for example, a wired network interface (such as a network interface card), a wireless network interface (such as a wireless network interface card), a modem, and any other suitable interface.

In some embodiments, communication interface 320 can also represent a host adapter configured to facilitate communication between computing system 300 and one or more additional network or storage devices via an external bus or communications channel Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 300 can also include at least one output device 342 (e.g., a display) coupled to system bus 324 via I/O interface 322, for example, to provide access to an administrator. The output device 342 can include any type or form of device capable of visual and/or audio presentation of information received from I/O interface 322.

Computing system 300 can also include at least one input device 344 coupled to system bus 324 via I/O interface 322, e.g., for administrator access. Input device 344 can include any type or form of input device capable of providing input, either computer or human generated, to computing system 300. Examples of input device 344 include, for example, a keyboard, a pointing device, a speech recognition device, or any other input device.

Figure 4:
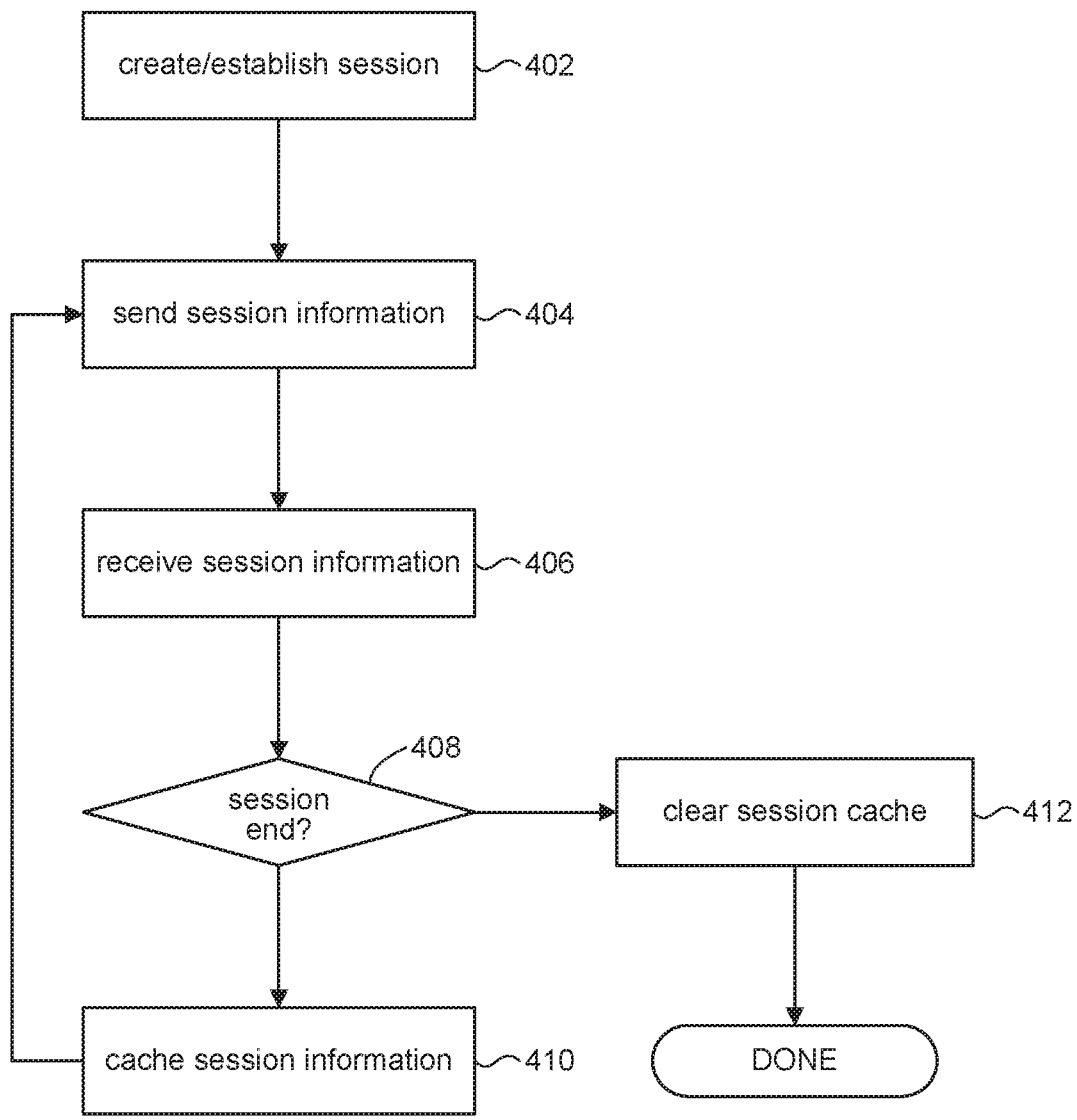
FIG. 4 shows a process flow for client-side session caching in accordance with some embodiments of the present disclosure.

Referring to FIG. 4 and other figures, the discussion will now turn to a high level description of processing in the client computer 104 for caching session context information (session caching) in accordance with the present disclosure, for example, via a database application 108 executing on the client computer 104. In some embodiments, for example, the client computer 104 may include computer executable program code (e.g., application 108), which when executed by a processing unit (e.g., 312, FIG. 3), can cause the client computer 104 to perform the processing in accordance with FIG. 4. The flow of operations performed by the computer system is not necessarily limited to the order of operations shown.

At operation 402, the client computer 104 can create or otherwise establish a session with the DBMS 102. For example, when a user invokes an application 108 to do work on the DBMS 102, the user may have to go through a login sequence to log onto the DBMS 102. This activity can create a login session. The session manager 110 in the DBMS 102 can set up some local data structures to store and maintain information for the user's login session.

At operation 404, the client computer 104 can send session context information to the DBMS 102. For example, during a login process, the client computer 104 can send the user's ID to the DBMS 102 as session information. The client computer 104 may access some locally stored information about the user (e.g., from a preference file) such as locale, language, monetary unit, the user's access level, etc., and send such information as default setting as part of establishing the session. The user can change such settings during their login session and/or add additional session information. In some embodiments, for example, in an SQL database system, the SET command can be used to set the session information:

SET key, value where key specifies the particular session attribute, such as locale, language, etc.

value is the session data to be cached, such as Germany (for locale), English (for language), and so on.

At operation 406, the client computer 104 can receive the session context information from the DBMS 102. In some embodiments, for example, the client computer 104 may not know that a particular command sent to the DBMS contains session information. It may not be until the DBMS 102 compiles the command that it can be determined the command contains session information. Accordingly, in some embodiments, the DBMS 102 can send such information in a response or other suitable message back to the client computer 104. It will be appreciated, however, that in other embodiments, an application 108 executing on the client computer 104 can be configured with capability of determining that a particular communication to the DBMS 102 contains session information, thus obviating this particular operation.

At operation 408, the client computer 104 can determine whether or not the session has ended. This can occur, for example, when the connection is dropped and has failed to recover the dropped connection, if the use has logged out, and so on. If it is determined that the session has ended, then processing can continue with operation 412; otherwise, processing can continue with operation 410.

At operation 410, the client computer 104 can cache the session context information. For example, the connection manager 208 in the client computer 104 can receives a response or other suitable message from the DBMS 102 that contains session information in a session cache 206 corresponding to the session. In some embodiments, the connection manager 208 can invoke a suitable API in the cache manager 204 to cache the received session information. The session cache 206 can be structured as a [key, value] storage, where the key identifies the particular session attribute and the value is actual session data; e.g., key=monetary_unit, value=US_dollars. If the key is not found in the session cache 206, then a new entry can be added to the session cache. Otherwise, the existing entry is updated with the latest value. Thus, only the latest updates made to the session information are cached, rather than a history of the updates. For example, if the session attribute monetary_unit is updated several times, only one entry for that attribute is cached and it will contain the latest update.

At operation 412, the client computer 104 can clear the session cache 206 for a given session that has ended. Any session caching that is being performed for other sessions can continue, however.

During the course of execution of the application 108, the user may set new session information or change previously set session information. The client computer 104 can repeat the process beginning at operation 404 to cache the new or changed session information. New session information can be added to the session cache (cache memory) 206 as a new [key, value] pair. A modification of existing session information can be stored by using the key to search the session cache 206.

Figure 5:
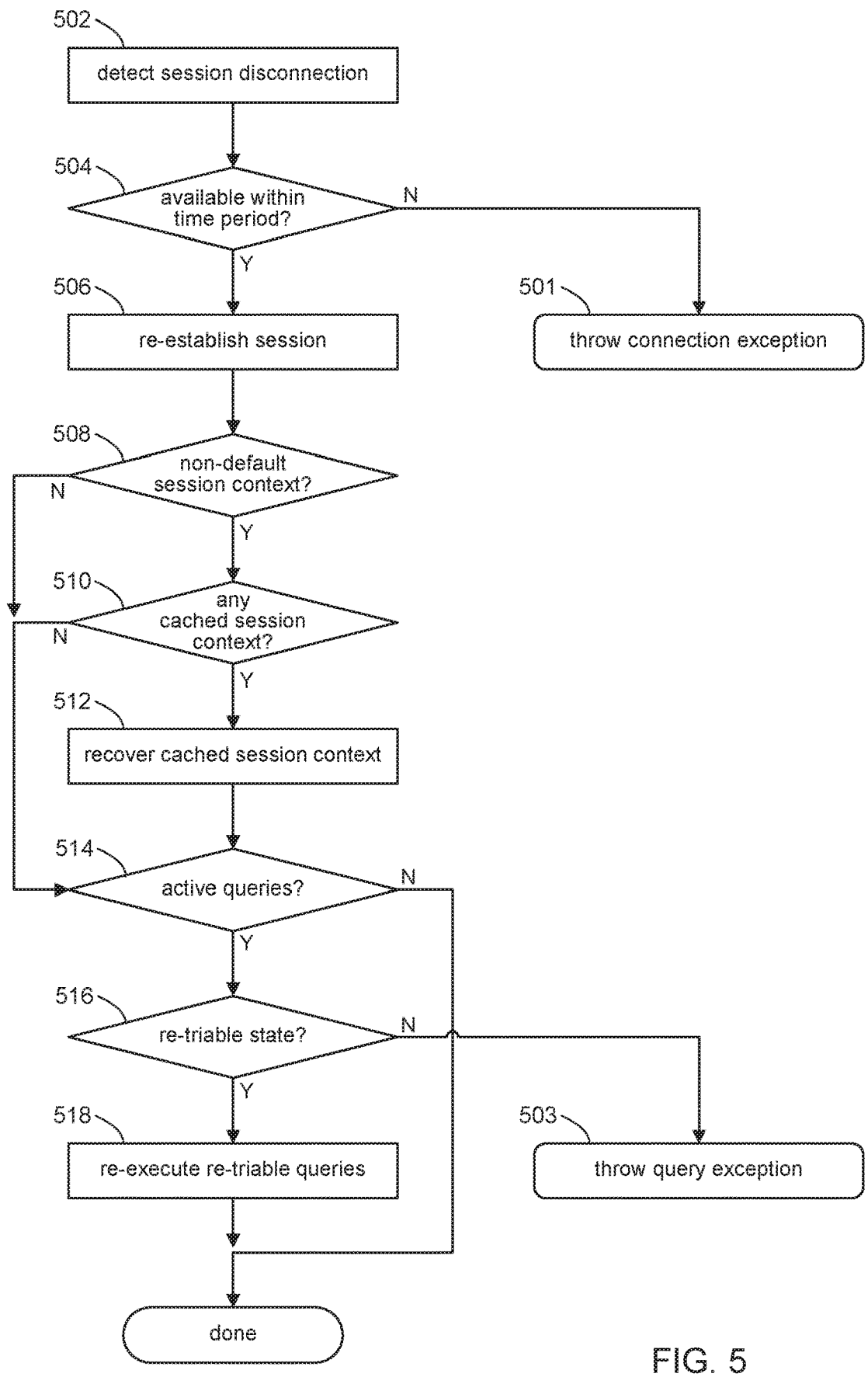
FIG. 5 shows a process flow for restoring a session from a client-side session cache in accordance with some embodiments of the present disclosure.

Referring to FIG. 5 and other figures, the discussion will now turn to a high level description of processing in the client computer 104 for re-establishing a disconnected session in accordance with the present disclosure, for example, via a database application 108 executing on the client computer 104. It will be understood, that these operations can be performed for each session that becomes disconnected. In some embodiments, for example, the client computer 104 may include computer executable program code (e.g., application 108), which when executed by a processing unit (e.g., 312, FIG. 3), can cause the client computer 104 to perform the processing in accordance with FIG. 5. The flow of operations performed by the computer system is not necessarily limited to the order of operations shown.

At operation 502, the client computer 104 can detect that a session (first session) with the DBMS 102 has disconnected. In some situations, a session disconnection can arise when communication with the DBMS 102 is interrupted, in which case every session in the client computer 104 will be disconnected. Interruption with the DBMS 102 can be detected or otherwise determined by any suitable manner, depending on the type of connection or communication with the DBMS 102. In some embodiments, for example, the connection manager 208 can use the TCI/IP protocol for communication with the DBMS 102. A TCP/IP socket error that occurs during communication with the DBMS 102 can serve to indicate a session disconnection. In other situations, even if communication with the DBMS 102 is not affected, a session disconnection can nonetheless occur. For example, if a data table in the DBMS 102 becomes corrupted, that can event can result in disconnecting only those sessions that were using the corrupted data table; other sessions may not necessarily be affected.

At operation 504, the client computer 104 can attempt to reconnect with the DBMS 102, in response to detecting a session disconnection. In some embodiments, for example, the client computer 104 can attempt to reconnect every n units of time (seconds, minutes), for m attempts. If at the end of m attempts, a connection is not established, the client computer 104 can throw an error (operation 501) indicative of a connection exception.

At operation 506, the client computer 104 can re-establish the disconnected session (second session) with the DBMS 102. After the client computer 104 has reconnected with the DBMS 102, the client computer 104 can take steps to re-establish the session. In some embodiments, for example, the client computer 104 can log the user back in, for example, by repeating the log in sequence.

At operation 508, the client computer 104 can determine whether there is any non-default session context information. In some embodiments, a session can have default settings for a set of default session attributes, so that when a session is established, client computer 104 can read in the default session settings (e.g., from disk) and set the session context in the DBMS 102 (e.g., using series of SET commands). In some embodiments, the client computer 104 can store a session flag to indicate that changes in the default settings have been made, or that session information other than the default session information has been cached. The session flag can be initially set to '0', and set to '1' when data is cached in the session cache 206 to indicate the existence of non-default session information. If non-default session information has been cached, then processing can continue with operation 510; otherwise, processing can continue with operation 514.

At operation 510, the client computer 104 can determine if there is any cached session context to restore. As discussed in operation 508, there should be session context information cached in the session cache 206. However, it is possible that the session cache 206 is cleared. For example, as explained in FIG. 4, session caching for a given session can be terminated when the session has ended. In such a case, session caching for the given session can be terminated and the session cache 206 can be cleared. If there is no cached session context, then processing can proceed to operation 514.

At operation 512, the client computer 104 can recover or restore the cached session context. In some embodiments, for example, the client computer 104 can issue a series of SET key, value operations to the DBMS 102 for each of the cached session information. When all to cached session information has been resent to the DBMS 102, recovery of the previous session context can be deemed complete. The remaining operations describe below are directed to processing any queries that were in progress when the session was disconnected.

At operation 514, the client computer 104 can determine whether there were any active queries pending at the time of session disconnection. If not, the processing can be deemed complete; otherwise, processing can continue with operation 516.

At operation 516, the client computer 104 can determine if any of the active queries are in a re-triable state. If none of the active queries are re-triable, then the client computer 104 can throw an exception to indicate that there were active queries, but none were re-triable; so that the application 108 can know to retry them, for example.

At operation 518, the client computer 104 can retry the re-triable queries.

Figure 6:
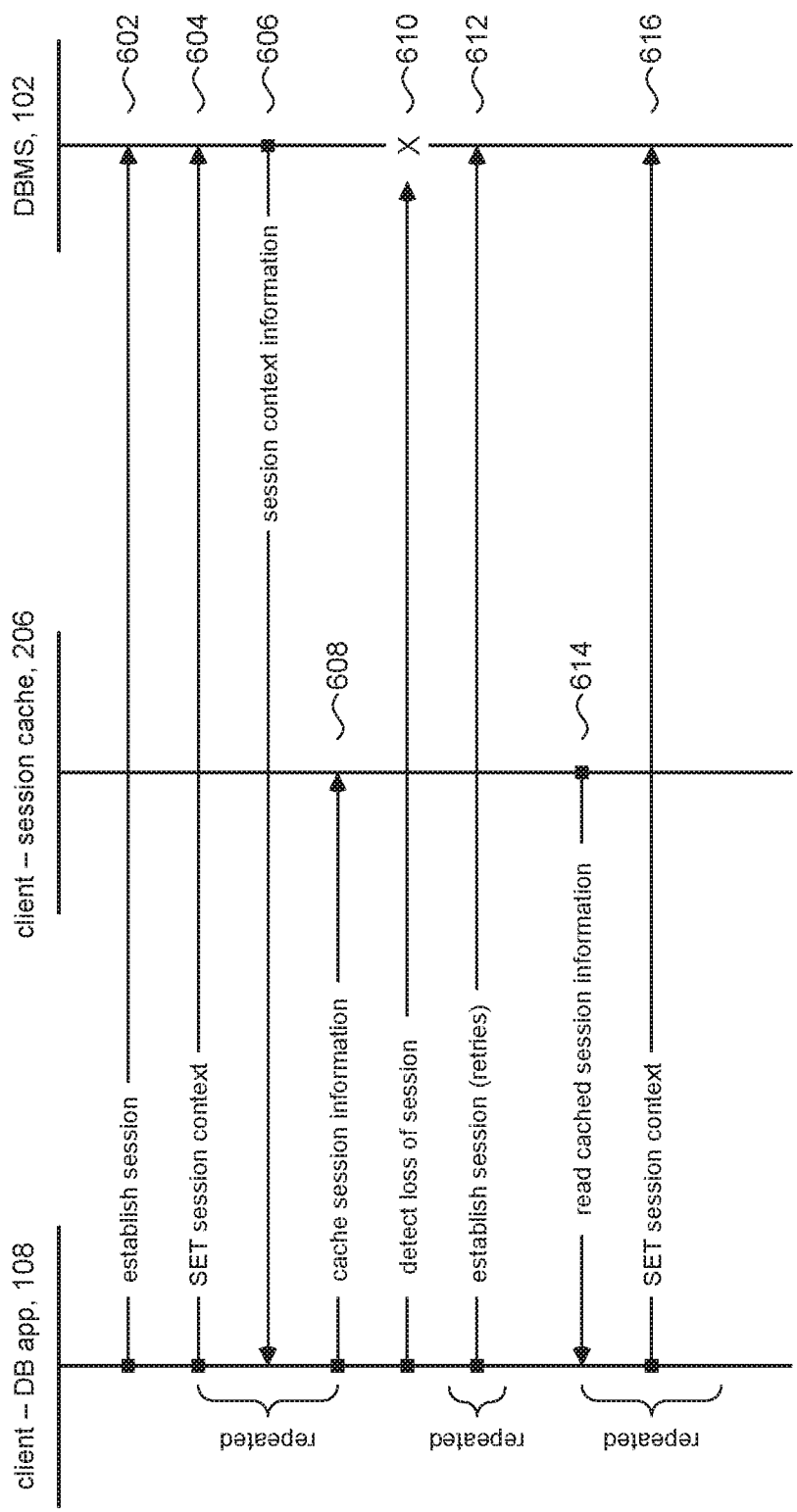
FIG. 6 shows a sequence diagram illustrating the flow for restoring a session from a client-side session cache in accordance with some embodiments of the present disclosure.

FIG. 6 is a sequence chart highlighting some of the communication paths in the process described in FIG. 5. For example, communication 602 shows that the application 108 can establish a session with the DBMS 102, for instance, by performing a login sequence. Communication 604 shows that the application 108 can issue a SET command to the DBMS 102 to set a session attribute (e.g., language=German). Communication 606 shows that the DBMS 102 can send the session information back to the application 108. Communication 608 shows that the application 108 can cache the session information in the session cache 206. As explained above, this sequence can be repeated during the life of the session. At 610, the application 108 detects a session disconnection. Communication 612 shows the application 108 attempting one or more retries to re-establish a new session with the DBMS 102. At 614, the application 108 can read in the cached session information and restore the previous session context by issuing a series of SET commands (communication 616).

Figure 7:
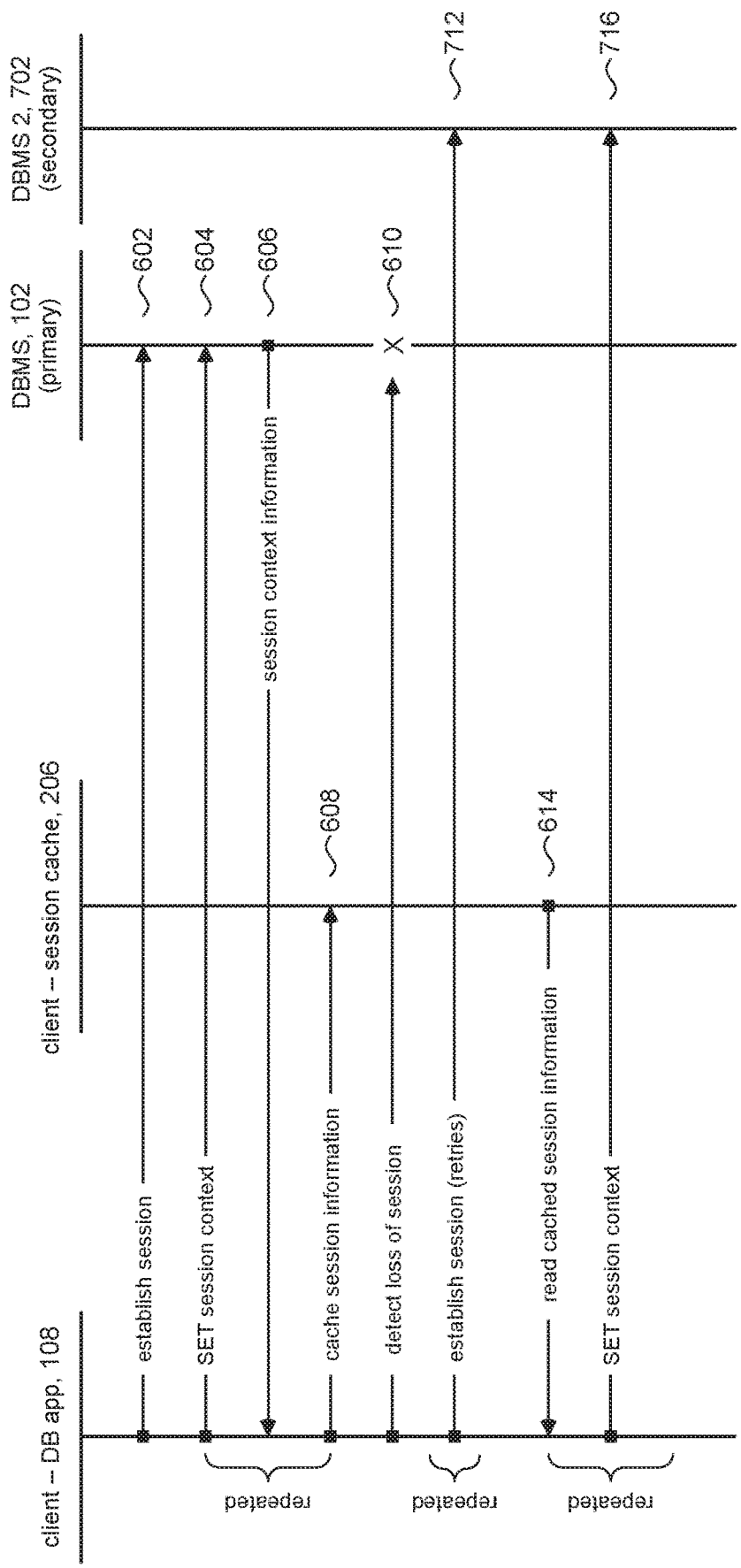
FIG. 7 shows a sequence diagram illustrating the flow for restoring a session from a client-side session cache in a takeover use case in accordance with some embodiments of the present disclosure.

FIG. 7 is a sequence chart highlighting some of the communication paths in the process described in FIG. 5 in the context of a transfer from a first DBMS (e.g., 102), acting as a primary DBMS, to a secondary DBMS. The transfer can be the result of a failover, where the primary DBMS has failed and the secondary DBMS takes over. In other scenarios, the transfer can be a scheduled takeover of the primary DBMS by the secondary DBMS. The communication paths in FIG. 7 are similar to those explained in FIG. 6 with some variations. Communication 712, for example, shows that session retries, subsequent to detection (at 610) of a disconnected session with the primary DBMS, can be made to a secondary DBMS 702. The switch-over from the primary DBMS to the secondary DBMS can be transparent to applications 108 executing on the client computer 104. The applications 108, for example, merely experience a disconnection of their respective sessions at 610. During the retries at 710, the underlying communication infrastructure that supports the primary and secondary DBMS's can perform recovery processing for the secondary DBMS to take over the primary DBMS, including redirecting the client computer 104 for communication with the secondary DBMS. When communication between the client computer 104 and the secondary DBMS is re-established, new sessions can be set up and session contexts for the previous sessions can be restored at 614 and 716.

CONCLUSION

Embodiments in accordance with the provide for session caching on the client computer, where each session that is established between the client computer and the database management system (DBMS) can be associated with a session cache. Updates made to the session context information corresponding to a give session can be cached in a respective session cache. When a disconnection with a given session is detected, a new session with the DBMS can be established. Session information associated with the disconnected session can be read in from the appropriate session cache and used to restore the session information of the disconnected session on the newly established session.

A conventional approach to session recovery relies on the client computer generating redo logs to track changes to the session context information associated with a session on the client computer. Every change to session information (e.g., by way of a SET command issued to the DBMS) can be logged. When session disconnection occurs, the redo log can be replayed on a newly established session to repeat the sequence of changes to the session. Keeping in mind that a client computer can be executing several database applications and that each database application can establish several sessions with the DBMS, the storing of redo logs can be costly in terms of increased processing to manage the storage of redo logs and increases storage needs to store the redo logs. This processing and storage burden can be exacerbated in a dynamic situation where session context is frequently updated. By contrast, embodiments in accordance with the present disclosure cache the latest updates made to the session information, thus significantly reducing the storage needs for a session cache.

Furthermore, session recovery using redo logs entails replaying the redo logs. When there are many redo logs to replay, the client computer can take considerable time just to re-establish a disconnected session. By contrast, embodiments in accordance with the present disclosure cache only the latest updates to the session information; there is no need to replay a log and so session recovery can be significantly faster.

Another approach to session recovery relies on the DBMS managing the session context information for every session from all client computers (users) connected to the DBMS. Managing so many sessions in the DBMS can impact the performance of the DBMS, requiring the DBMS to spend significant resources just to manage session information. By contrast, embodiments in accordance with the present disclosure effectively redistribute much of the workload from the DBMS to each client computer.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a computer system, the method comprising:
   establishing a first database session with a database system, the establishing of the first database session including communicating default session settings;
   communicating first non-default session information from the computer system to the database system, which defines a first session context of the first database session, the first session information including a first attribute and first data;
   caching the first non-default session information for the first database session in a cache memory of the computer system as a new key-value entry if a first key identifying the first attribute is not in the cache memory, or if the first key is in the cache memory, updating a value of an existing key-value entry having the first key to be first data;
   setting a first session flag to indicate non-default session information is cached;
   establishing a second database session in response to detecting a disconnection of the first database session, the establishing of the second database session including communicating the default session settings;
   determining that non-default session information is cached based on the first session flag; and
   issuing a series of SET key-value operations using the key-value entries that are cached in the cache memory of the computer system for the first database session to transparently restore the first session context having non-default session information.

2. The method of claim 1, wherein caching the first session information includes receiving a communication from the database system comprising the first session information that was communicated to the database system and caching the first session information contained in the received communication.

3. The method of claim 1, wherein the second database session is established with a second database system different from the database system.

4. The method of claim 1, comprising terminating caching of the second session information for the second database session in response to receiving a communication from the database to terminate the caching of the second session information.

5. The method of claim 4, further comprising clearing the cache memory of second session information for the second database session when caching is terminated for the second database session.

6. A non-transitory computer-readable storage medium having stored thereon computer executable instructions, which when executed by a computer device, cause the computer device to:
   establish a first database session with a database system, the establishing of the first database session including communicating default session settings;
   communicate first non-default session information from the computer system to the database system, which defines a first session context of the first database session, the first session information including a first attribute and first data;
   cache the first non-default session information for the first database session in a cache memory of the computer system as a new key-value entry if a first key identifying the first attribute is not in the cache memory, or if the first key is in the cache memory, updating a value of an existing key-value entry having the first key to be first data;
   set a first session flag to indicate non-default session information is cached;
   establish a second database session in response to detecting a disconnection of the first database session, the establishing of the second database session including communicating the default session settings;
   determine that non-default session information is cached based on the first session flag; and
   issue a series of SET key-value operations using the key-value entries that are cached in the cache memory of the computer system for the first database session to transparently restore the first session context having non-default session information.

7. The non-transitory computer-readable storage medium of claim 6, wherein caching the first session information includes receiving a communication from the database system comprising the first session information that was communicated to the database system and caching the first session information contained in the received communication.

8. The non-transitory computer-readable storage medium of claim 6, wherein the second database session is established with a second database system different from the database system.

9. The non-transitory computer-readable storage medium of claim 6, wherein the computer executable instructions, which when executed by the computer device, further cause the computer device to terminate caching of the second session information for the second database session in response to receiving a communication from the database to terminate the caching of the second session information.

10. The non-transitory computer-readable storage medium of claim 6, wherein the computer executable instructions, which when executed by the computer device, further cause the computer device to clear the cache memory of second session information for the second database session when caching is terminated for the second database session.

11. An apparatus comprising:
one or more computer processors; and
a computer-readable storage medium comprising instructions for controlling the one or more computer processors to be operable to:
establish a first database session with a database system, the establishing of the first database session including communicating default session settings;
communicate first non-default session information from the computer system to the database system, which defines a first session context of the first database session, the first session information including a first attribute and first data;
cache the first non-default session information for the first database session in a cache memory of the computer system as a new key-value entry if a first key identifying the first attribute is not in the cache memory, or if the first key is in the cache memory, updating a value of an existing key-value entry having the first key to be first data;
set a first session flag to indicate non-default session information is cached;
establish a second database session in response to detecting a disconnection of the first database session, the establishing of the second database session including communicating the default session settings;
determine that non-default session information is cached based on the first session flag; and
issue a series of SET key-value operations using the key-value entries that are cached in the cache memory of the computer system for the first database session to transparently restore the first session context having non-default session information.

12. The apparatus of claim 11, wherein caching the first session information includes receiving a communication from the database system comprising the first session information that was communicated to the database system and caching the first session information contained in the received communication.

13. The apparatus of claim 11, wherein the second database session is established with a second database system different from the database system.

14. The apparatus of claim 11, wherein the computer-readable storage medium further comprises instructions for controlling the one or more computer processors to be operable to terminate caching of the second session information for the second database session in response to receiving a communication from the database to terminate the caching of the second session information.

15. The method of claim 1, wherein the second session information includes temporary tables.

16. The non-transitory computer-readable storage medium of claim 6, wherein the second session information includes temporary tables.

17. The method of claim 1, further comprising:
establishing a third database session with the database system;
communicating third session information from the computer system to the database system, which defines a third session context of the third database session;
caching the third session information for the third database session in the cache memory of the computer system; and
terminating caching of the third session information for the third database session when an amount of data comprising the third session information exceeds a predetermined value.

18. The method of claim 1, wherein only latest updates made to session information are cached, rather than a history of updates to the session information.

19. The method of claim 1, wherein keys of cached key-value entries specify a particular session attribute, wherein the particular session attribute is one locale, language, monetary unit, access level, application information, application name, user information, user name, wherein values of the cached key-value entries specify session data for the corresponding session attribute.

20. The method of claim 1, further comprising:
determining whether active queries of the first database session are in a re-triable state; and
throwing an exception if none of the active queries are re-triable, the exception indicating that there were active queries and that none of the active queries are re-triable.

* * * * *